(12) United States Patent
Jover Daza et al.

(10) Patent No.: US 12,161,935 B2
(45) Date of Patent: Dec. 10, 2024

(54) COMPUTER DEVICE WITH JOYSTICK

(71) Applicant: KING.COM LIMITED, St. Julians (MT)

(72) Inventors: Francisco José Jover Daza, Barcelona (ES); Sergi Diaz, Barcelona (ES)

(73) Assignee: KING.COM LTD., St. Julians (MT)

( * ) Notice: Subject to any disclaimer, the term of this patent is extended or adjusted under 35 U.S.C. 154(b) by 177 days.

(21) Appl. No.: 17/854,618

(22) Filed: Jun. 30, 2022

(65) Prior Publication Data
US 2024/0001234 A1    Jan. 4, 2024

(51) Int. Cl.
*A63F 13/533*    (2014.01)
*A63F 13/2145*   (2014.01)
*A63F 13/537*    (2014.01)

(52) U.S. Cl.
CPC ........ *A63F 13/533* (2014.09); *A63F 13/2145* (2014.09); *A63F 13/537* (2014.09); *A63F 2300/1075* (2013.01); *A63F 2300/303* (2013.01); *A63F 2300/308* (2013.01)

(58) Field of Classification Search
CPC .... A63F 13/2145; A63F 13/42; A63F 13/537; A63F 2300/1075; A63F 2300/308
See application file for complete search history.

(56) References Cited

U.S. PATENT DOCUMENTS

| | | | |
|---|---|---|---|
| 2005/0225530 A1* | 10/2005 | Evans | A63F 13/22 345/156 |
| 2017/0056768 A1* | 3/2017 | Aizawa | A63F 13/22 |
| 2019/0358542 A1* | 11/2019 | Howard | A63F 13/2145 |

* cited by examiner

*Primary Examiner* — Jasson H Yoo
(74) *Attorney, Agent, or Firm* — Saul Ewing LLP

(57) ABSTRACT

A user device has a touchscreen on which a joystick is displayed. The joystick has one or more input translation layers which modify the behaviour of the joystick to match the required game physics of a game entity.

19 Claims, 8 Drawing Sheets

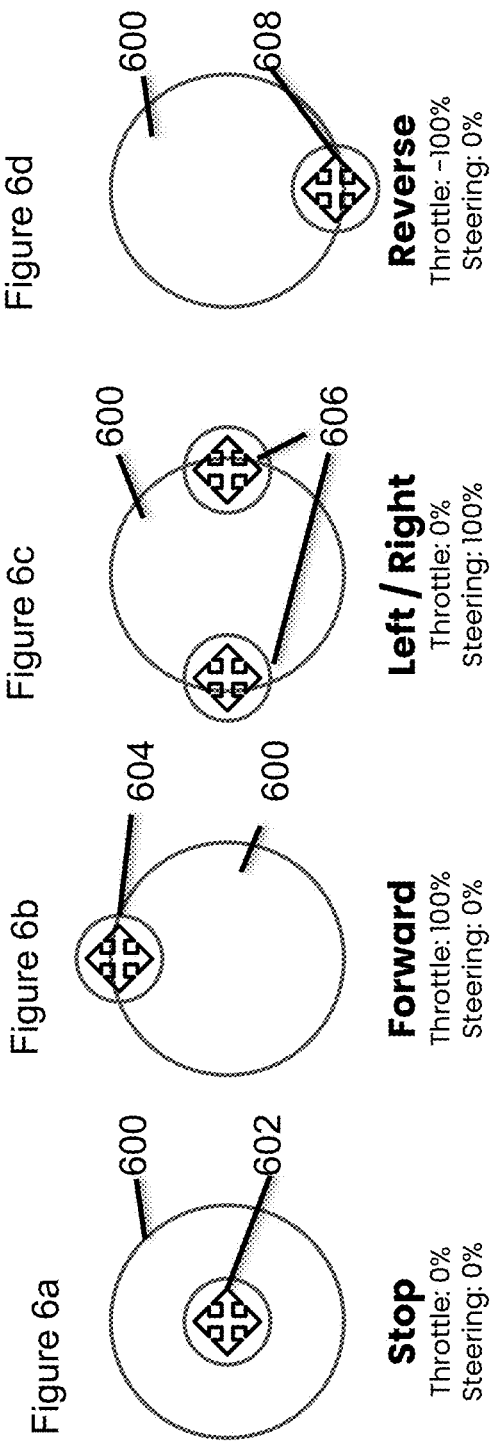

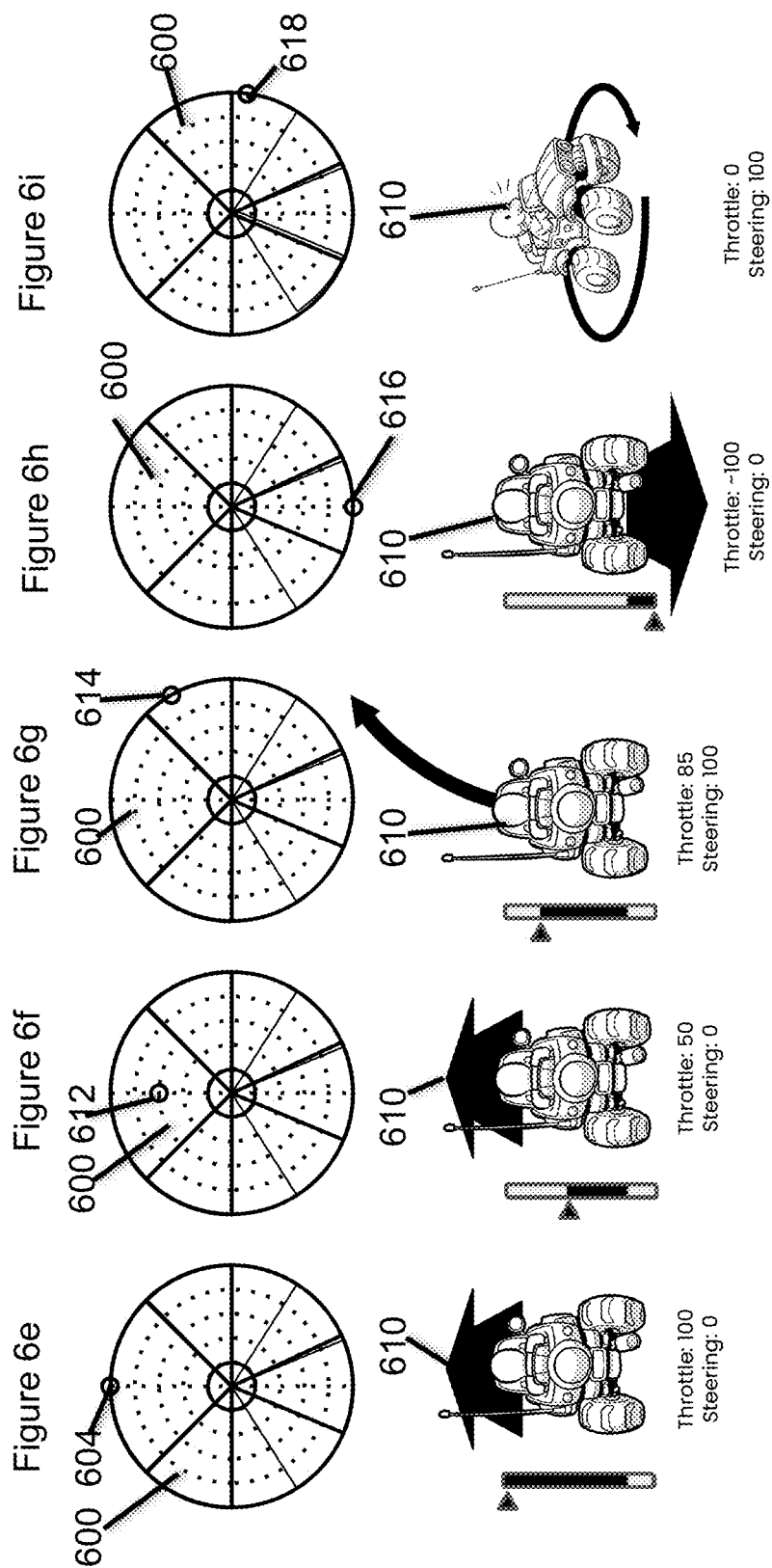

COMPUTER DEVICE WITH JOYSTICK

FIELD OF THE INVENTION

Some embodiments relate to a computer device with a joystick.

BACKGROUND OF THE INVENTION

There exist many types of computer device where the display is controlled by an input. The input may be a cursor or pointer that is controlled by a human interface device such as a mouse, joystick, keyboard etc. Increasingly, the display may comprise a touchscreen which can be controlled by a user's touch. That is, activation of functions or objects are responsive to user input made by way of the user touching the screen.

A joystick area may be provided on a touchscreen. The joystick area may receive a user input to control two or more different parameters associated with a game entity. However, this may provide only a crude control over the movement of the game entity. The movement of the game entity may not match an expected behaviour of the entity.

This patent specification describes not only various ideas and functions, but also their creative expression. A portion of the disclosure of this patent document therefore contains material to which a claim for copyright is made and notice is hereby given: Copyright King.com Limited 2022 (pursuant to 17 U.S.C. 401). A claim to copyright protection is made to all screen shots, icons, look and feel and all other protectable expression associated with the games illustrated and described in this patent specification.

The copyright owner has no objection to the facsimile reproduction by anyone of the patent document or the patent disclosure, as it appears in the Patent and Trademark Office patent file or records, but reserves all other copyright rights whatsoever. No express or implied license under any copyright whatsoever is therefore granted.

SUMMARY OF THE INVENTION

According to an aspect, there is provided a computer device configured to provide a computer implemented game, the computer device comprising: a touch screen configured to display a joystick for controlling a game entity of the computer implemented game and to receive user input interacting with the joystick; and at least one processor configured to control one or more parameters associated the game entity in response to user input interacting with the joystick by determining one of more of a location of the user input with respect to the displayed joystick and movement of the user input with respect to the displayed joystick, wherein the joystick comprises a plurality of areas, the at least one processor configured to control the absolute maximum magnitude of one or more of the parameters in one area of the plurality of areas to be different to the absolute maximum magnitude of the one or more of the parameters in another of the plurality of areas.

The joystick may be divided into a first set of areas relating to a first of the plurality of parameters and a second set of areas relating to a second of the plurality of parameters, each set of areas covering a common control area of the joystick.

The first and second areas may be provided by respective input control layers. The input control layers may modify a uniform behaviour of the joystick.

A number of areas in the first set of areas is different to a number of areas of the second set of areas.

A number of areas in the first set of areas may be the same as the number of areas of the second set of areas.

The first set of areas relating to the first of the plurality of parameters may coincide with the second set of areas relating to the second of the plurality of parameters.

The first set of areas relating to the first of the plurality of parameters may not be aligned with the second set of areas relating to the second of the plurality of parameters.

One or more of the areas of the first set of area and/or one or more areas of the second areas may have a single absolute maximum magnitude associated with that respective area.

One or more of the areas of the first set of areas and/or one or more areas of the second areas may have an absolute maximum magnitude which varies in dependence on a distance from one or more adjacent areas of the respective set of areas.

The first set of areas may control throttle and may comprise a full forward throttle area, at least one transition forward throttle area, a full reverse throttle area and at least one transition reverse throttle area.

The first set of areas may further comprise at least one area where no throttle is applied.

The second set of areas may control steering and may comprise at least one full steering area, at least one transition steering area, and at least one no steering area.

A value of a respective parameter in a respective area may be linear along a radius of the joystick.

A value of a respective parameter in a respective area may be non-linear along a radius of the joystick.

A forward direction controlled by the joystick may be aligned with an axis of the touchscreen.

A forward direction controlled by the joystick may be oriented at an angle with respect to an axis of the touchscreen.

The touchscreen may be configured to display a circular joystick.

The game entity may be a vehicle.

One or more of the one or more parameters may comprise a movement parameter.

One or more parameters may comprise one or more of throttle, speed and steering.

A plurality of joystick options may be provided, each joystick option being associated with one or more different settings which provide a different response to a same input to the joystick.

The plurality of joystick options may be associated with different terrain in the computer implemented game.

The plurality of joystick options may be associated with different camera options in the computer implemented game.

According to an aspect, there is provided a computer device configured to provide a computer implemented game, the computer device comprising: a touch screen configured to display a joystick for controlling a game entity of the computer implemented game and to receive user input interacting with the joystick; and at least one processor configured to control one or more parameters associated the game entity in response to user input interacting with the joystick by determining one of more of a location of the user input with respect to the displayed joystick and movement of the user input with respect to the displayed joystick, wherein the joystick comprises one or more input translation layers to modify the behaviour of the joystick.

According to another aspect, there is provided a computer implemented method performed by a user device configured to provide a computer implemented game, the method comprising: displaying on a touch screen of the user device a joystick for controlling a game entity of the computer implemented game; receiving user input interacting with the joystick; and controlling one or more parameters associated the game entity in response to user input interacting with the joystick by determining one of more of a location of the user input with respect to the displayed joystick and movement of the user input with respect to the displayed joystick, wherein the joystick comprises a plurality of areas, and the method comprises controlling the absolute maximum magnitude of one or more of the parameters in one area of the plurality of areas to be different to the absolute maximum magnitude of the one or more of the parameters in another of the plurality of areas.

The joystick may be divided into a first set of areas relating to a first of the plurality of parameters and a second set of areas relating to a second of the plurality of parameters, each set of areas covering a common control area of the joystick.

The first and second areas may be provided by respective input control layers. The input control layers may modify a uniform behaviour of the joystick.

A number of areas in the first set of areas is different to a number of areas of the second set of areas.

A number of areas in the first set of areas may be the same as the number of areas of the second set of areas.

The first set of areas relating to the first of the plurality of parameters may coincide with the second set of areas relating to the second of the plurality of parameters.

The first set of areas relating to the first of the plurality of parameters may not be aligned with the second set of areas relating to the second of the plurality of parameters.

One or more of the areas of the first set of area and/or one or more areas of the second areas may have a single absolute maximum magnitude associated with that respective area.

One or more of the areas of the first set of areas and/or one or more areas of the second areas may have an absolute maximum magnitude which varies in dependence on a distance from one or more adjacent areas of the respective set of areas.

The first set of areas may control throttle and may comprise a full forward throttle area, at least one transition forward throttle area, a full reverse throttle area and at least one transition reverse throttle area.

The first set of areas may further comprise at least one area where no throttle is applied.

The second set of areas may control steering and may comprise at least one full steering area, at least one transition steering area, and at least one no steering area.

A value of a respective parameter in a respective area may be linear along a radius of the joystick.

A value of a respective parameter in a respective area may be non-linear along a radius of the joystick.

A forward direction controlled by the joystick may be aligned with an axis of the touchscreen.

A forward direction controlled by the joystick may be oriented at an angle with respect to an axis of the touchscreen.

The touchscreen may be configured to display a circular joystick.

The game entity may be a vehicle.

One or more of the one or more parameters may comprise a movement parameter.

One or more parameters may comprise one or more of throttle, speed and steering.

A plurality of joystick options may be provided, each joystick option being associated with one or more different settings which provide a different response to a same input to the joystick.

The plurality of joystick options may be associated with different terrain in the computer implemented game.

The plurality of joystick options may be associated with different camera options in the computer implemented game.

According to an aspect, there is provided a computer readable non-transitory storage medium carrying one or more computer executable instructions which when run on at least one processor cause a method to be performed, said method comprising: displaying, on a touch screen of a user device, a joystick for controlling a game entity of the computer implemented game; receiving user input interacting with the joystick; and controlling one or more parameters associated the game entity in response to user input interacting with the joystick by determining one of more of a location of the user input with respect to the displayed joystick and movement of the user input with respect to the displayed joystick, wherein the joystick comprises a plurality of areas, and the method comprises controlling the absolute maximum magnitude of one or more of the parameters in one area of the plurality of areas to be different to the absolute maximum magnitude of the one or more of the parameters in another of the plurality of areas.

According to another aspect, there is provided a computer implemented method performed by a user device configured to provide a computer implemented game, the method comprising: displaying a joystick on a touchscreen of the user device; determining that a user has removed user input from the joystick; determining that the user has provided a subsequent user input to the joystick; and determining if a joystick position is to be updated.

The method may comprise determining that the joystick position is to be updated if a distance between the removed user input and the subsequent user input is less than a threshold distance.

The threshold distance is a radius of the joystick.

The method may comprise determining that the joystick position is to be updated if a time between the removed user input and the subsequent user input is more than a threshold time.

The method may comprise determining that the joystick position is to be updated if a position of the subsequent user input is lower down the touchscreen than the removed user.

The user input may be provided by a thumb or other digit of a user's hand.

According to another aspect, there is provided a user device configured to provide a computer implemented game, the user device comprising: a touchscreen configured to display a joystick; and at least one processor configured to determine: that a user has removed user input from the joystick; that the user has provided a subsequent user input to the joystick; and if a position of the joystick is to be updated.

The at least one processor may be configured to determine that the joystick position is to be updated if a distance between the removed user input and the subsequent user input is less than a threshold distance.

The threshold distance is a radius of the joystick.

The at least one processor may be configured to determine that the joystick position is to be updated if a time between the removed user input and the subsequent user input is more than a threshold time.

The at least one processor may be configured to determine that the joystick position is to be updated if a position of the subsequent user input is lower down the touchscreen than the removed user.

The user input may be provided by a thumb or other digit of a user's hand.

According to an aspect, there is provided a computer readable non-transitory storage medium carrying one or more computer executable instructions which when run on at least one processor cause: displaying of a joystick on a touchscreen of user device; determining that a user has removed user input from the joystick; determining that the user has provided a subsequent user input to the joystick; and determining if a joystick position is to be updated.

A computer program comprising program code means adapted to perform the method(s) may also be provided. The computer program may be stored and/or otherwise embodied by means of a carrier medium.

In the above, many different embodiments have been described. It should be appreciated that further embodiments may be provided by the combination of any two or more of the embodiments described above.

Various other aspects and further embodiments are also described in the following detailed description and in the attached claims.

BRIEF DESCRIPTION OF DRAWINGS

To understand some embodiments, reference will now be made by way of example only to the accompanying drawings, in which:

FIGS. 6a to 6i show examples of input with respect to a joystick which has different throttle and steering responses;

DETAILED DESCRIPTION

The terms user and player are used interchangeably throughout this document and no specific meaning is intended using one or the other unless the context suggests otherwise. Likewise user device and client device are used interchangeably throughout this document and no specific meaning is intended using one or the other unless the context suggests otherwise.

In the following description of various implementations of embodiments, reference is made to the accompanying drawings which form a part thereof, and in which are shown by way of illustration various implementations in which the invention may be utilized. It is to be understood that other implementations may be utilized, and structural and functional modifications may be made without departing from the scope of the present invention.

A person skilled in the art will realise that what is described herein are certain example embodiments. It is possible to implement embodiments in a number of variations.

Figure 1:
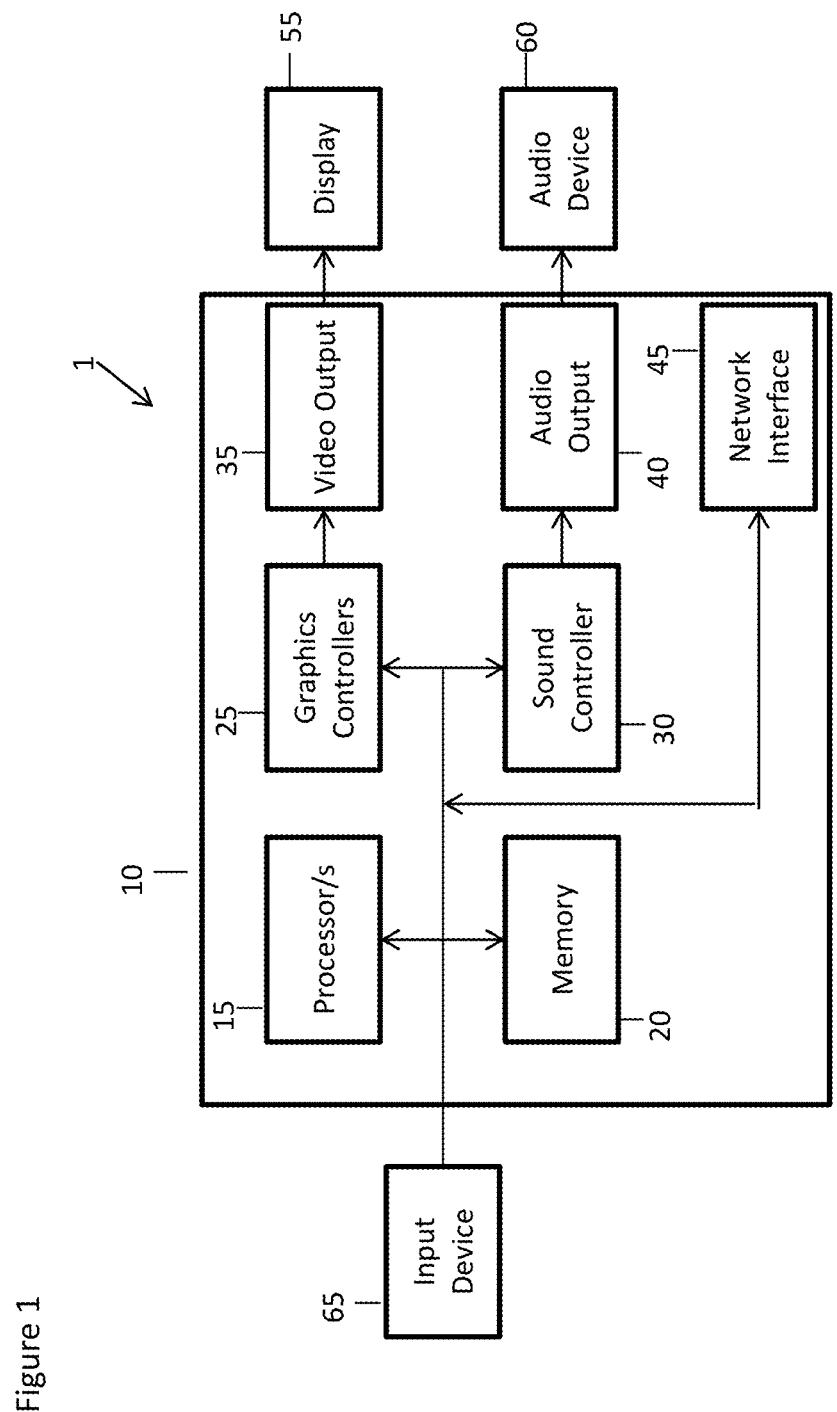
FIG. 1 shows an example device in which some embodiments may be provided.

A schematic view of a user or client device 1 which may be configured to provide one or more embodiments is shown in FIG. 1. The user device may be configured to provide a computer implemented game. All of the blocks shown are implemented by suitable circuitry. The blocks may be implemented in hardware and/or software. The user device may have a control part 10. The control part may be implemented by one or more processors 15 and one or more memories 20.

The control part 10 is shown as having a graphics controller 25 and a sound controller 30. It should be appreciated that one or other or both of the graphics controller 25 and sound controller 30 may comprise one or more processors and/or be provided by the one or more processors 15. The graphics and sound controllers may comprise memory and/or may operate in conjunction with the one or more memories 20.

The graphics controller 25 is configured to provide a video output 35. The sound controller 30 is configured to provide an audio output 40. The video output 35 is provided to a display 55. The audio out 40 is provided to an audio device 60 such as a speaker and or earphone(s).

The control part 10 has an interface 45 allowing the device to be able to communicate with a network such as the Internet or other communication infrastructure.

The device 1 has an input device or user interface 65. The input device can take any suitable format and can be a touch screen. It should be appreciated that the display 55 may in some embodiments also provide the input device 65 by way of an integrated touch screen for example.

The blocks of the control part 10 are configured to communicate with each other by an interconnect such as a bus or any other suitable interconnect and/or by point to point communication.

It should be appreciated that in some embodiments, the controller may be implemented by one or more integrated circuits, at least in part.

The user device 1 is shown by way of example only. In alternative embodiments, one or more of the parts may be omitted. Alternatively or additionally, some embodiments may comprise one or more other parts. Alternatively or additionally, one or more parts may be combined.

It should be appreciated that in some embodiments, the controller 110 may be implemented by one or more integrated circuits, at least in part.

The user device 100 is shown by way of example only. In alternative embodiments, one or more of the parts may be omitted. Alternatively or additionally, some embodiments may comprise one or more other parts. Alternatively or additionally, one or more parts may be combined.

The user device may be a so-called smart phone or tablet. In some embodiments, the user device may be relatively small with a relatively small touch screen or display. In some embodiments, the computer device may be a laptop or desktop computer.

Some embodiments provide a computer device which is configured to provide a computer implemented game. The computer game may any suitable type.

Some embodiments may be provided in the context of a multi-player game. Players may control one or more game entities which interact with one or more game entities of other players. Thus different players will play the same instance of the game on their own device. Each player will only be able to control their own game entities. Information about the game entities is provided by the player's device to a server. The server will provide that information to the other players which are playing the same instance of the multi-player game.

Some embodiments may be provided in the context of a single player game. The player may control one or more game entities.

In one example, the entities are cars. The entities may be attack one another by crashing into one another and/or by using weapons or objects which can be aimed at the entities of other players. However, it should be appreciated that the entities can be visualised in any other suitable form.

It should be appreciated that embodiments may be using in any other suitable computer implemented game which requires a joystick.

Figure 2:
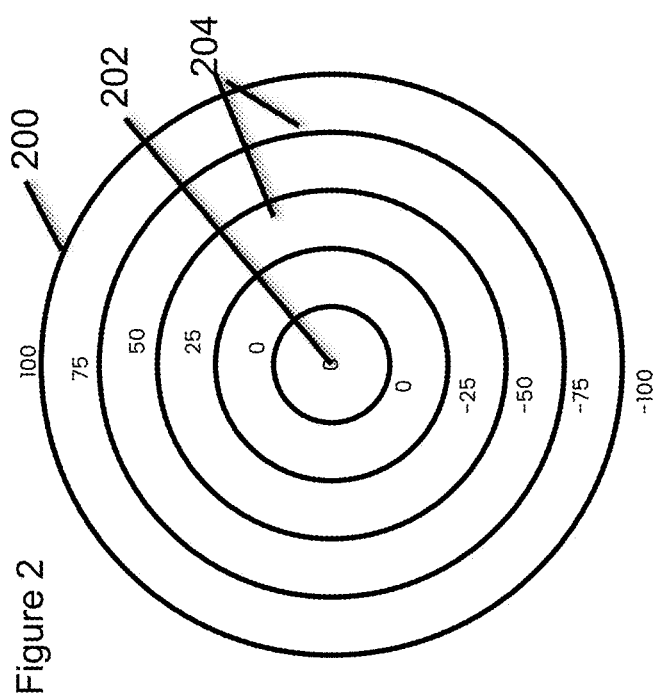
FIG. 2 shows a joystick provided on a touch screen display with a uniform response across the joystick.

Reference is made to FIG. 2 which show an example joystick 200 which is displayed on a touch screen of the user device. In this example, the joystick 200 is configured to provide two control outputs, velocity and direction.

The velocity output is based on how far the players input is from center of joystick area 202. As shown in FIG. 2, there are a number of concentric rings 204 around the centre 202.

These concentric rings may be displayed on the display to assist the player when providing user input. However in other embodiments, these concentric rings are only used by the at least one processor to determine the output which is associated with the particular location of the input. In this later case, the concentric ring are not visually displayed and effectively are represented by computer program code.

These concentric rings each represent a percentage of a maximum velocity. The further the ring 204 is from the centre, the higher the velocity. For example the outer most ring 204 represents a maximum velocity with the other rings in this example representing 0, 25, 50, and 75 percent of the maximum velocity. These position of the user input with respect to these rings represent the velocity output associated with the user's touch input.

The direction output is based on where the user's input is in the joystick area. For example, if the user's input is "north" of the center, the game entity may move straight ahead. If the user's input is "south" of the centre, the game entity may move in a reverse direction. If the user's input is east of the centre, the game entity may move to the right. If the user's input is west of the centre, the game entity may move to the left. Of course, intermediate movement directs will be provided for user input between these directions. In the context of this document, the terms "north", "south", "east" and "west" should not be regarded as true geographically representations of direction but instead may indicated a direction with respect to the display on which the joystick is displayed.

Thus, depending on the location of the user input, the game entity will be controlled to move in a particular direction and at a particular velocity. However, this method of handling these inputs may not be suitable for all game entities. For example, this method may be suitable for controlling some game entities such as some characters but may not be suitable for controlling other game entities. For example, this method may not be particularly suitable for vehicles. The suitability of this method may depend on the game physics of the game entity. For example, with the outlined method, the steering of a game entity in the form of a vehicle may seem to be too instantaneous and not in line with the expected physics behavior. For example, there is no drifting of the vehicle if the vehicle is being turned at a high velocity.

Some embodiments use an input translation layer to modify the effects of the player's input in a way that better reflects the expected physics behavior of the game entity. This input translation layer is a modification which is applied by the at least one processor to the user's input received in the joystick area.

In some embodiments, two or more input translation layers may be provided, with each translation layer representing the control of one parameter.

Alternatively, a single translation layer may modify two or more parameters.

The input layer is shown visually to explain the modifications applied to the output of the joystick depending on the location of the user input. In practice the input layer is embodied as computer code which defines the output in response to a given user input.

In some embodiments a generic joystick is provided such as described in relation to FIG. 2 with one or more input layers being provided for one or more different entities. A respective different input layer(s) may be provided for one or more different game entities.

In some embodiments, the joystick may be implemented with the input layers integrated as part of the computer program for providing a control output in dependence on the user input with respect to the joystick area.

In some embodiments, depending on where in the joystick area the user's input is received, the velocity and/or direction inputs are modified compared to the example of FIG. 2. In the example where the game entity is a vehicle, the velocity input is replaced by a throttle input which controls the velocity of the game entity.

Figure 3:
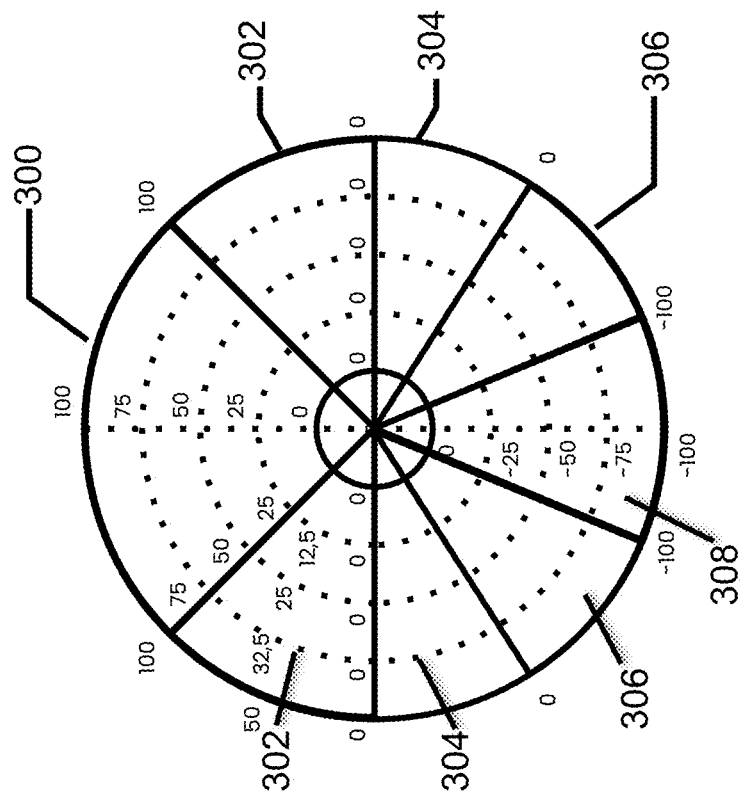
FIG. 3 shows a first example of a joystick provided on a touch screen display with different areas having a different throttle response.

FIG. 3 gives one example of a modification provided by some embodiments to the joystick behavior discussed in relation to FIG. 2. The joystick may be generally circular. The input translation layer applied by the at least one processor modifies the behavior of the throttle. In the first area 300 of the joystick area, the behavior of the throttle is not modified, and the player is able to select up to 100% of the maximum throttle value, depending on the position of the user input in the first area 300 of the joystick area. The first area 300 of the joystick area corresponds to movement of the game entity in a generally forwards direction (north direction). The first area includes the directly forward direction of the game entity as well as an area on either side of that directly forward direction.

On either side of the first area 300 of the joystick area are respective second areas 302. The second areas correspond to a transition throttle area. When the user input is in a respective second area 302, the more that the user input attempts to turn the game entity, the more that the velocity is capped. This helps simulate vehicle drift whilst the game entity is being moved generally in a forward direction. In these second areas, the velocity is capped all the way down to zero, the closer that the direction is to due right or to due left (that is at 90 degrees to the straight ahead direction).

Opposite to the first area is a third area 308 of the joystick area. This third area 300 includes the direct reverse direction as well as an area on either side of that direct reverse direction. In the example shown in FIG. 3, the third area is smaller than the first area 300. However, in other embodiments, the first area may be the same size as the third area or even smaller than the third area.

When in the third area 308, there is no modification of the behaviour of the throttle and the game entity is able to move in a reverse direction up to the maximum throttle/velocity.

On either side of the third area 308 of the joystick area are respective fourth areas 306. The fourth areas correspond to a reverse transition throttle area. When the user input is in a respective fourth area 306, the more that the user input attempts to turn the game entity, the more that the velocity is capped. This helps simulate vehicle drift whilst the game entity is being moved generally in a backward direction. In these fourth areas, the velocity is capped all the way down to zero, the closer that the direction is to a no man's land which will be described next.

Between each of the second and fourth areas is a fifth area which is also referred to as a no man's land area 304. In this region 304, there is no throttle applied. Only steering is provided when a user input is received in the fifth area of the joystick area. This may help transition between forward and reverse. This may avoid the situation where the user provides an input to apply a hard turn to the game entity resulting in oversteering and accidentally get into the reverse zone.

When the user input moves into the fourth area 306 from the fifth area 304, the fourth area input will mimic the behavior of the fifth area input. However, when the user input moves into the fourth area 306 from the third area 308, this fourth area input acts as a transition throttle area but in the reverse direction.

The areas may be segments where the joystick is circular. It should be appreciated that is other embodiments, the areas of the joystick may be different shapes to segments.

Figure 4:
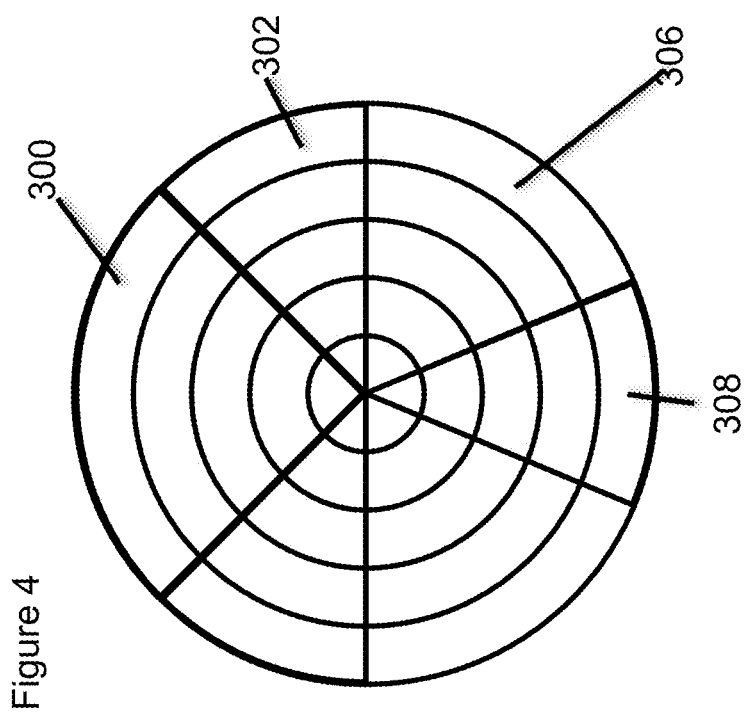
FIG. 4 shows a second example of a joystick provided on a touch screen display with different areas having a different throttle response.

It should be appreciated that the size of each of these areas may be changed in different embodiments. In some embodiments, one or more of these areas may be omitted. For example, reference is made to FIG. 4 which shows another example of a modification provided by some embodiments where the input translation layer applied by the at least one processor modifies the behavior of the throttle. In this example, the no man's land or fifth area is provided. The first to fourth areas 300, 302, 306 and 308 function as outlined previously. However, in this example the respective fourth areas are between the third and respective second areas.

Figure 5:
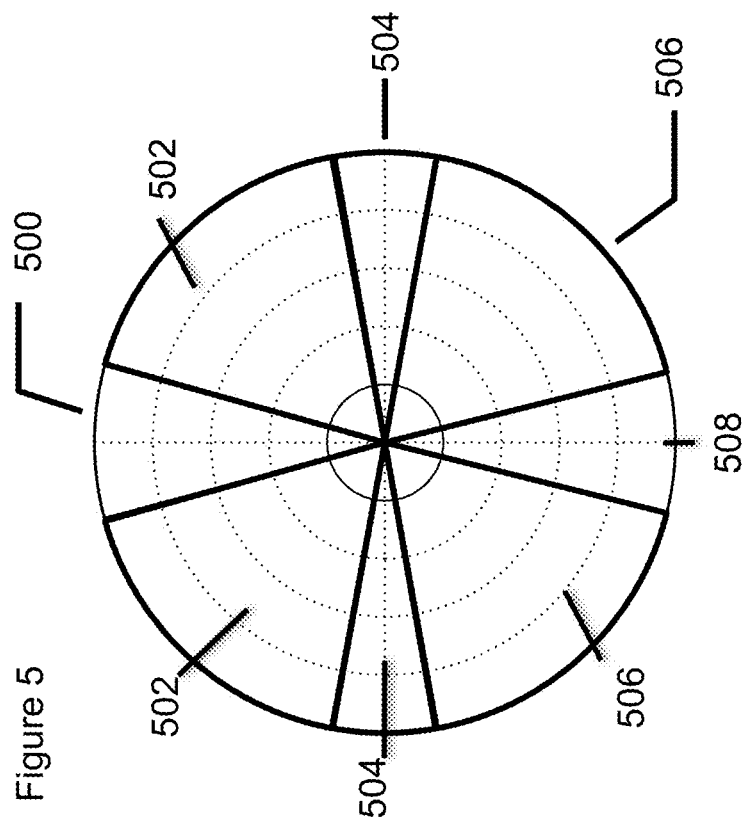
FIG. 5 shows a third example of a joystick provided on a touch screen display with different areas having a different steering response.

FIG. 5 gives one example of a modification provided by some embodiments where the input translation layer applied by the at least one processor modifies the behavior of the steering. When the user input is provided in a first area 500 corresponding to a forward direction no steering is provided. Likewise, when user input is provided in a third area 508 corresponding to a reverse direction no steering is provided. The third area is opposite the first area. The first and third areas may be the same or different sizes.

Second areas 502 are provided on either side of the first area. In these second areas, the steering response is modified with the steering response being increased the further the user input in the second area is from the first area.

Fourth areas 506 are provided on either side of the third area. In these fourth areas, the steering response is modified with the steering response being increased the further the user input in the fourth area 506 is from the third area 508.

Fifth areas 504 are provided between respective second 502 and fourth areas 506. The fifth areas 504 are generally at right angles to the first and third area. In these fifth areas 504 a full steering response is provided. The fifth area 504 on the right side of the joystick will provide a full steering response to the right and the fifth area 504 on the left side of the joystick will provide a full steering response to the left.

Steering is modified based on which segment or area the user's input is in. In the first and third areas, steering is not applied. In second and fourth areas, the steering response is gradually increased taking into account how close the user input is to fifth area. The closer the user input to the fifth area, the greater the steering response. In the fifth area a full or 100 percent steering response is applied The sizes of each area and/or number of areas may be varied as compared to the examples shown. The number of different areas may be more or less than the examples shown in FIGS. 3, 4 and 5. The relative size of the areas may be varied as compared to the examples shown in FIGS. 3, 4 and 5.

It should be appreciated that the maximum of a parameter in a particular area, may be different to the maximum value of the parameter in another area. The different maximum values of the parameter in that particular area can be selected as required depending on the required physics of the game entity being controlled.

One or more areas may be associated with a single maximum parameter value. Alternatively or additionally, one or more areas may have a maximum parameter which varies depending on how close the user input is to another area. This for example allows there to be gradual changes in the maximum value of a parameter where the area in question is between two areas with different maximum parameter values. By way of example, this may be the second areas of the previously described examples.

or stepwise

It should be appreciated, that in some embodiments, the input layer or layers used to control a game entity may be varied depending on one or more other game factors. For example, the one or more input layers may be varied depending on the terrain. Of course, different types of game entity may be associated with one or more different input layer or layers.

Figure 7:
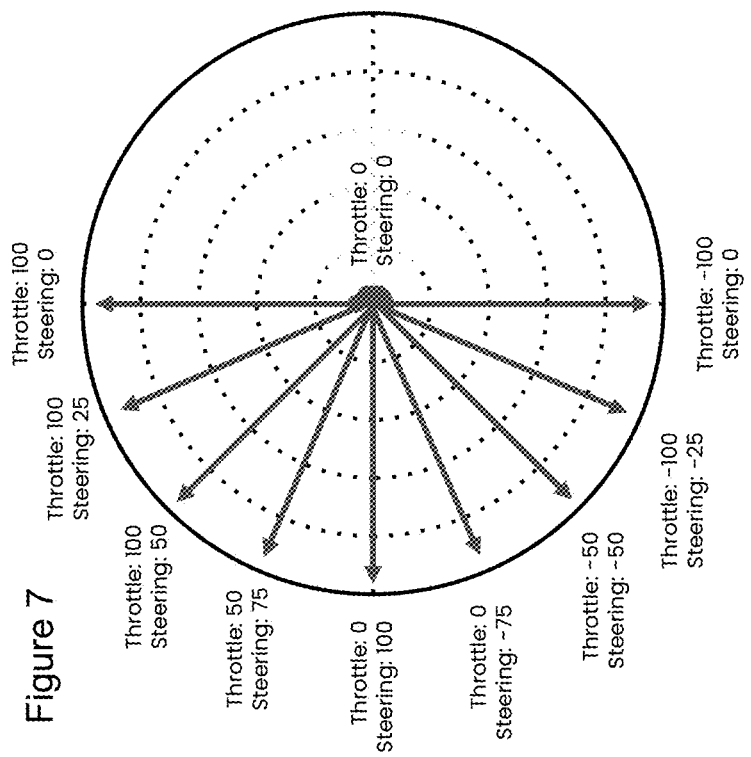
FIG. 7 shows a schematic view of a joystick provided on a touch screen display providing different throttle and steering responses.

Reference is made to FIGS. 6a to 6i which show various examples where the input layer modifying the steering as previously described is combined with the input layer modifying the throttle as previously described. In this regard, reference is made to FIG. 7 which schematically shows the throttle and steering values where a throttle input layer is combined with a steering input layer. It should be appreciated that the areas of the throttle input layer may or may not coincide with the areas of the steering input layer. In the example of FIG. 7, the north direction will have a 100% maximum throttle and 0% of the maximum steering value. The south direction will have −100% (were "−" indicates a reverse direction) maximum throttle and 0% steering. The west direction will have a 0% maximum throttle and 100% steering. Moving from the north direction to the west direction, the values are as follows: throttle 100%, steering 25%; throttle 100%, steering 50%; and throttle 50%, steering 75%. Moving from the west direction to the south direction, the values are as follows: throttle 0%, steering −75%; throttle −50%, steering −50%; and throttle −100%, steering −25%. Similar values are provided from north to south via the east direction. These values represent the maximum possible value for an input which is received at the edge of the joystick.

In FIG. 6a, an input 602 is provided in the middle area of the joystick 600. When the user input received at this location, there will be no throttle and no steering. In other words, the game entity may be stationary or moving in a constant direction and at a constant speed.

In the example shown in FIG. 6b, the input 604 is received on the edge of the joystick 600 in the north direction. This provides a maximum throttle response for this direction which is 100% of the maximum throttle. There will no steering as the game entity is simply moving straight ahead.

In the example shown in FIG. 6c, the input 606 is received on the edge of the joystick in the east direction. This provides a full (100%) steering response. There will no throttle as the game entity is steered to the right. Also shown in the example shown in FIG. 6c, the input 606 is received on the edge of the joystick 600 in the west direction. This provides a full (100%) steering response. There will no throttle as the game entity is steered to the left. (It should be appreciated that the inputs shown in FIG. 6c would not be provided at the same time.)

In the example shown in FIG. 6d, the input 608 is received on the edge of the joystick 600 in the south direction. This provides a maximum throttle response for this direction which is 100% of the maximum throttle. There will no steering as the game entity is simply reversing.

Reference is made to FIG. 6e which corresponds to FIG. 6b and illustrates the game entity 610 moving in a forward direction at full throttle. The input 604 is received on the edge of the joystick 600 in the north direction. This provides a maximum throttle response for this direction which is 100% of the maximum throttle. There will no steering as the game entity is simply moving straight ahead.

Reference is made to FIG. 6f which also illustrates the game entity 610 moving in a forward direction but at less than full throttle, 50% in this example. The input 612 is received at a position of a radius of the joystick 600 in the north direction. The positions corresponds the concentric ring representing 50% throttle This provides a throttle response for this direction which is 50% of the maximum throttle. There will no steering as the game entity is simply moving straight ahead.

Reference is made to FIG. 6g which also illustrates the game entity 610 being steered in a northeast direction but at less than full throttle, 85% in this example. The input 614 is received on an edge of the joystick 600 in the northeast direction where the maximum throttle available in that direction is 85% of the maximum throttle in the forward direction. As the input is in the second area, the steering will be at 100% of its maximum.

In the example shown in FIG. 6h, the input 616 is received on the edge of the joystick 600 in the south direction. This provides a maximum throttle response for this direction which is 100% of the maximum throttle. There will no steering as the game entity 610 is simply reversing.

Finally, in FIG. 6i the user input 618 is provided on the edge of the joystick 600 in the so called no-man's area. Is area, there is no throttle is provided but 100% of the steering is provided to control the game entity 610.

Figure 8:
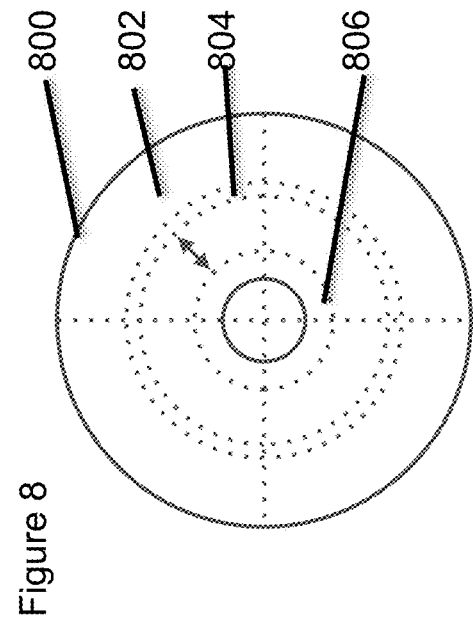
FIG. 8 shows another example of a joystick having a nonlinear response along a radius of the joystick.

In the previously described embodiments, the concentric rings are evenly spaced meaning that there is a linear response along the radius of the joystick. For example the percentage of the maximum velocity on that radius of the joystick will vary from 0 to 100% of the maximum velocity for that radius of the joystick. In some embodiments, the concentric rings may not be evenly spaced. This allows for a nonlinear response to be provided. In this regard, reference is made to FIG. 8 which shows an example of a joystick where the outer concentric ring 800 represents a 100% of the maximum velocity for the given radius and the innermost concentric ring 806 represents a zero velocity. Between the innermost and outermost centric rings is a first concentric rings 802 representing 75% of the maximum velocity and a second concentric ring 804 representing 25% of the maximum velocity. As can be seen from the example of FIG. 8, the distance between the first and second concentric rings is relatively small provides a relatively narrow range. In practice, the game entity being controlled is more likely to be moving at a velocity above 75% of the maximum or below 25%. Thus the position of the concentric rings can be controlled in order to provide the desired response of the parameter which is controlled based on distance along a radius. This provides the option to have a movement physics which can be modified depending on the game entity being controlled.

Figure 9A:
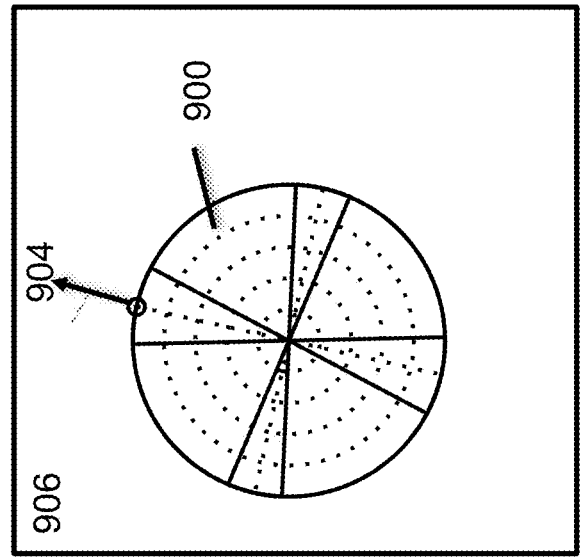
FIGS. 9a and 9b show two examples of a joystick orientation with respect to a touchscreen display.
Figure 9B:
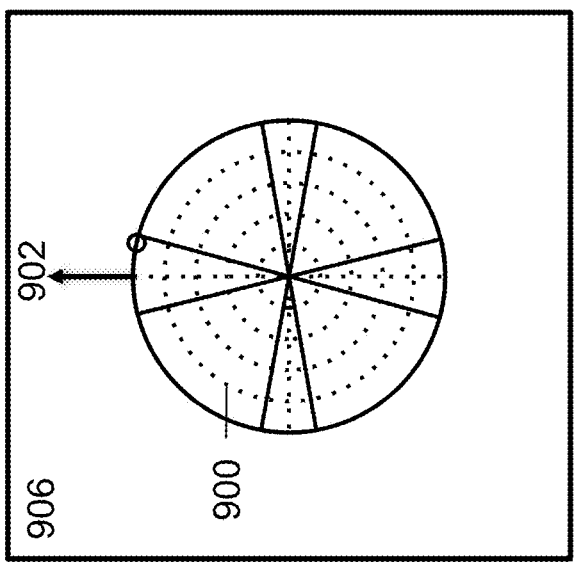

Reference is made to FIGS. 9a and 9b which shows a modification. FIG. 9a shows a joystick 900 such as previously described and oriented such that the straight ahead direction 902 is aligned with an orientation of the display 906 on which the joystick is displayed. In some embodiments the orientation of the joystick is modified such as shown in FIG. 9b. In FIG. 9b, the joystick 900 is oriented such that the straight ahead direction 904 of the joystick is angled with respect to the orientation of the display 906. The angle may in some examples be between 0 and 90 degrees.

The previous examples have been described in the context of controlling a game entity in the form of a vehicle and, in particular, a car. It should be appreciated that other embodiments can be used to control any other type of a game entity. In particular embodiments, allow the inputs provided via the joystick to be modified by the input translation layer or layers such that any required game physics required for a particular game entity can be supported.

In some embodiments, two or more "camera" options are provided. These camera options may be pre-set. The camera options may set one or more of distance and field of view. For example, one pre-set camera option may have a shorter distance and a narrower field of view and another pre-set camera option may have a longer distance and a wider field of view. In some embodiments, the required camera options are provided by the at the least one processor in response to user input. In some embodiments, different input layer or layers used to control a game entity are provided depending on the selected camera option. This may compensate for example, for the user experience with longer camera distance and wider field of views. The user may feel that they are not controlling properly the vehicles or other game entity with the longer camera distances. The input layer or layers are modified to take this into account.

In some embodiments, the user may be able to provide user input via the user interface to select one of a plurality of different camera pre-set options. For example there may be a button displayed on the display which will cycle through the different camera pre-set options each time it is pressed or selected.

Longer distance cameras may be configured with a higher elasticity—that is they have a small delay when reacting to the player's controls to avoid motion sickness. That elasticity increases the feeling that a player may have of not controlling the vehicle accurately. The vehicle reacts as usual, but because the camera does not, the player has a smaller point of reference. This means that they may not perceive a movement change until it is too late. The player may react by oversteering in the opposite direction. This makes it hard to maintain the vehicle in a straight line.

In some embodiments, each pre-set camera option is provided with its own joystick settings. This means that the joystick response is tuned to the camera settings. For example, with a longer distance camera, the joystick steering sensitivity is reduced as compared to a shorter distance camera. This may deal with the oversteering issue which arise with the longer distance camera option mentioned previously.

A joystick which is displayed on the display is associated with a reference position. The reference position is where the centre of the joystick gets placed, so usually, when the player presses on the screen, that initial press position is detected. The joystick is placed just in that same position. Any drag from that will control the position of a game entity. That initial position is the 'reference position' of the joystick.

Sometimes a player may end up with their thumb high up on the touchscreen while using the joystick. This is because the player usually starts placing their thumb on the lowest position of the screen. The player then moves their thumb up the screen in order of start moving forward. However, with some intense gameplay, the player may release their thumb at a relatively high position on the touchscreen and press again. This makes the joystick reset the reference position higher up the touchscreen, so the player needs to move the thumb even further in order to start moving forward again.

To try to address this issue, one or both of the following may be provided in some embodiments:

1—A waiting time may be provided before the joystick's reference position is reset between release and a new press. So if the player releases the thumb and presses again before this time ends, the previous reference position is kept for the joystick. However, if the player waits for longer than the waiting time before pressing again, the reference position gets reset on a new press.

However, it may be that the player is deliberately trying to reset the reference position quickly (that is more quickly than the waiting time). Accordingly, in some embodiments, it is assumed that the reference position is intentionally being reset if the new press is lower than the last reference position. This avoids the problem where if the new press was higher, the player needed to drag even higher to start moving forward. Where the new reference position is lower, is straight forward for the user to move up from that lower position.

If the distance between the released position and the new position is longer than the joystick radius (or other threshold distance), then it is assumed that the player intended to reset the joystick position.

2—An area in which the reference position is allowed to be placed is provided. This is so the joystick has an idle/default position when it is not active (that is the player is not touching it). An area around this initial position is provided where the reference position is allowed to be placed when the player touches with the thumb. This means that if the player places the thumb close to this initial position, the joystick will get reset right under the thumb, and the player will need to move up to start moving the character. However, if the player performs this first touch in a further position, the reference position of the joystick is placed in the maximum allowed position for it, and then the joystick lever will be placed under the thumb making it to be already in the position where the character is already moving forward. Thus the player is able, just by pressing on a higher position on the screen, able to make the game move forward without needing to drag his thumb higher.

Figure 10:
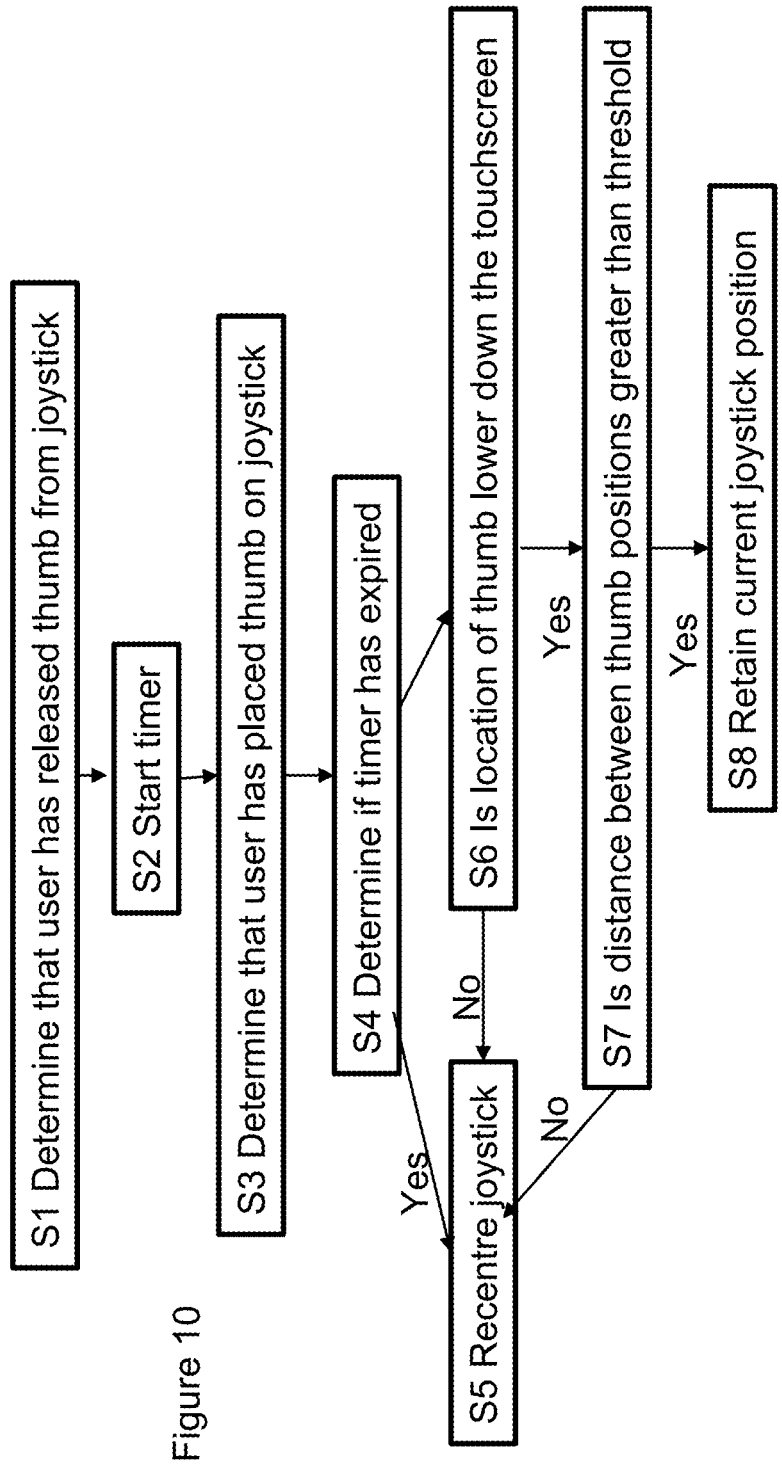
FIG. 10 shows a method of some embodiments.

Reference is made to FIG. 10 which shows a method of some embodiments. In step S1, it is determined by the at least one processor that the user has released his thumb from the joystick.

In step S2, a timer is started. This is for the waiting time mentioned previously.

In step S3, it is determined by the at least one processor that the user has placed their thumb on the joystick.

In step S4, it is determined by the at least one processor if the timer has expired.

If so, the next step is step S5. In step S5, the at least one processor is configured to reset the reference position of the joystick. This may thus recentre the joystick.

In the timer has not expired, then the next step is step S6. In step S6, it is determined by the at least one processor if the location of the thumb is further down the touchscreen.

If so, the next step is step S5.

If the location of the thumb is not further down the touchscreen, the next step is step S7.

In step S7, it is determined by the at least one processor if the position of the thumb is more than a threshold distance from the previous position of the thumb. The threshold distance may be of the order of the radius of the joystick in some embodiments.

If so, the next step is step S5.

If the distance between the locations of the thumb is less than the threshold distance, the next step is step S8.

In step S8, the reference position of the joystick is not changed.

It should be appreciated that the method of FIG. 10 can be used with any type of joystick displayed on a touchscreen and not with only the previous examples. In other words, the joystick may also be used with the type of joystick outlined in relation to FIG. 2.

It should be appreciated that the order of some of the steps in FIG. 10 may be changed. For example steps S4, S6 and S7 may take place in any order and one or more of those steps may be carried out at the same time.

The previous examples have been described in the context of controlling the velocity and direction of a game entity. It should be appreciated that in other embodiments, one or more other parameters may be alternatively or additionally controlled. For example, the one or more other parameters may be used to control the type of movement made by the game entity, how high the game entity jumps and/or falls, a shooting or fighting action of the character, and/or any other suitable parameter.

In this document, some embodiments have been described where the user input is provided by a thumb. It should be appreciated that input may be provided by any other digit of the user's hand or by a device such as a stylus or in any other suitable manner.

Some embodiments have been described in the context of specific types of product/software. It should be appreciated that this is by way of example only and other embodiments may be implemented using any other product/software.

Embodiments provide computer programs embodied on a distribution medium, comprising program instructions which, when loaded into electronic apparatuses, constitute the apparatuses as explained above. The distribution medium may be a non-transitory medium.

Other embodiments provide computer programs embodied on a computer readable storage medium, configured to control a processor to perform embodiments of the methods described above. The computer readable storage medium may be a non-transitory medium.

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. The computer readable medium or computer readable storage medium may be a non-transitory medium.

An appropriately adapted computer program code product or products may be used for implementing the embodiments, when loaded on an appropriate data processing apparatus. The program code product for providing the operation may be stored on, provided, and embodied by means of an appropriate carrier medium. An appropriate computer program can be embodied on a computer readable record medium. A possibility is to download the program code product via a data network. In general, the various embodiments may be implemented in hardware or special purpose circuits, software, logic, or any combination thereof.

Some embodiments may be provided as a computer program product, included on a computer or machine-readable medium having stored thereon the executable instructions of a computer-readable program that when executed on at least one processor cause a method according to some embodiments to be carried. The terms "computer-readable medium" or "machine-readable medium" as used herein includes any medium that participates in providing instructions to a processor or other components of computer system for execution. Such a medium may take many forms including, but not limited to, storage type media, such as non-volatile media and volatile media, and transmission media. Common forms of non-volatile media include, for example, a floppy disk, a flexible disk, a hard disk, magnetic tape or any other magnetic medium, a compact disc ROM (CD-ROM) or any other optical medium, punch cards or any other physical medium with patterns of holes, a programmable ROM (PROM), an erasable PROM (EPROM), electrically EPROM (EEPROM), a flash memory, any other memory chip or cartridge, or any other medium. Some embodiments may be downloaded or distributed as a computer program product, wherein the computer-readable program instructions may be transmitted from a remote computer such as a server to a user device by way of data signals embodied in a carrier wave or other propagation medium via a network.

It is also noted herein that there are several variations and modifications which may be made to the disclosed solution without departing from the scope of the present disclosure.

The invention claimed is:

1. A computer device configured to provide a computer implemented game, the computer device comprising:
   a touch screen configured to display a joystick for controlling a game entity of the computer implemented game and to receive user input interacting with the joystick; and
   at least one processor configured to control one or more parameters associated the game entity in response to user input interacting with the joystick by determining one of more of a location of the user input with respect to the displayed joystick and movement of the user input with respect to the displayed joystick,
   wherein the joystick comprises a plurality of areas, the at least one processor configured to control the absolute maximum magnitude of one or more of the parameters in one area of the plurality of areas to be different to the absolute maximum magnitude of the one or more of the parameters in another of the plurality of areas, and
   wherein the joystick is divided into a first set of areas relating to a first of the plurality of parameters and a second set of areas relating to a second of the plurality of parameters, each set of areas covering a common control area of the joystick.

2. The computer device as claimed in claim 1, wherein a number of areas in the first set of areas is different to a number of areas of the second set of areas.

3. The computer device as claimed in claim 1, wherein a number of areas in the first set of areas is the same as the number of areas of the second set of areas.

4. The computer device as claimed in claim 1, wherein the first set of areas relating to the first of the plurality of parameters coincide with the second set of areas relating to the second of the plurality of parameters.

5. The computer device as claimed in claim 1, wherein the first set of areas relating to the first of the plurality of parameters are not aligned with the second set of areas relating to the second of the plurality of parameters.

6. The computer device as claimed in claim 1, wherein one or more of the areas of the first set of area and/or one or more areas of the second areas have a single absolute maximum magnitude associated with that respective area.

7. The computer device as claimed in claim 1, wherein one or more of the areas of the first set of areas and/or one or more areas of the second areas have an absolute maximum magnitude which varies in dependence on a distance from one or more adjacent areas of the respective set of areas.

8. The computer device as claimed in claim 1, wherein the first set of areas controls throttle and comprise a full forward throttle area, at least one transition forward throttle area, a full reverse throttle area and at least one transition reverse throttle area.

9. The computer device as claimed in claim 8, wherein the first set of areas further comprises at least one area where no throttle is applied.

10. The computer device as claimed in claim 1, wherein the second set of areas controls steering and comprise at least one full steering area, at least one transition steering area, and at least one no steering area.

11. The computer device as claimed in claim 1, wherein a value of a respective parameter in a respective area is linear along a radius of the joystick.

12. The computer device as claimed in claim 1, wherein a value of a respective parameter in a respective area is non-linear along a radius of the joystick.

13. The computer device as claimed in claim 1, wherein a forward direction controlled by the joystick is aligned with an axis of the touchscreen.

14. The computer device as claimed in claim 1, wherein a forward direction controlled by the joystick is oriented at an angle with respect to an axis of the touchscreen.

15. The computer device as claimed in claim 1, wherein a plurality of joystick options are provided, each joystick option being associated with one or more different settings which provide a different response to a same input to the joystick.

16. The computer device as claimed in claim 15, wherein the plurality of joystick options are associated with different terrain in the computer implemented game.

17. The computer device as claimed in claim 15, wherein the plurality of joystick options are associated with different camera options in the computer implemented game.

18. A computer implemented method performed by a user device configured to provide a computer implemented game, the method comprising:
   displaying on a touch screen of the user device a joystick for controlling a game entity of the computer implemented game;
   receiving user input interacting with the joystick; and controlling one or more parameters associated the game entity in response to user input interacting with the joystick by determining one of more of a location of the user input with respect to the displayed joystick and movement of the user input with respect to the displayed joystick, wherein the joystick comprises a plurality of areas, and the method comprises controlling the absolute maximum magnitude of one or more of the parameters in one area of the plurality of areas to be different to the absolute maximum magnitude of the one or more of the parameters in another of the plurality of areas and wherein the joystick is divided into a first set of areas relating to a first of the plurality of parameters and a second set of areas relating to a second of the plurality of parameters, each set of areas covering a common control area of the joystick.

19. A computer readable non-transitory storage medium carrying one or more computer executable instructions which when run on at least one processor cause a method to be performed, said method comprising:

displaying, on a touch screen of a user device, a joystick for controlling a game entity of the computer implemented game; receiving user input interacting with the joystick; and controlling one or more parameters associated the game entity in response to user input interacting with the joystick by determining one of more of a location of the user input with respect to the displayed joystick and movement of the user input with respect to the displayed joystick, wherein the joystick comprises a plurality of areas, and the method comprises controlling the absolute maximum magnitude of one or more of the parameters in one area of the plurality of areas to be different to the absolute maximum magnitude of the one or more of the parameters in another of the plurality of areas and wherein the joystick is divided into a first set of areas relating to a first of the plurality of parameters and a second set of areas relating to a second of the plurality of parameters, each set of areas covering a common control area of the joystick.

* * * * *